Jan. 17, 1933.    J. YOUHOUSE    1,894,455
SYNCHRONOUS MOTOR
Filed May 9, 1930
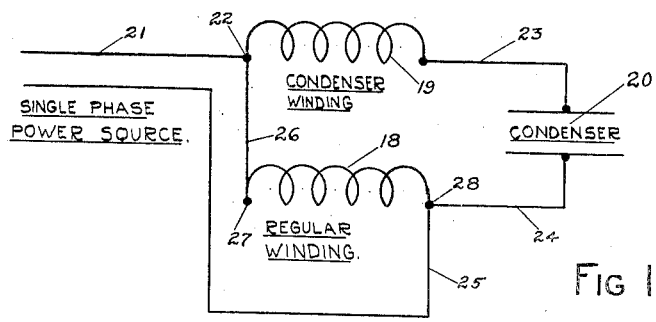
CONNECTION OF MOTOR WINDINGS AND CONDENSER.
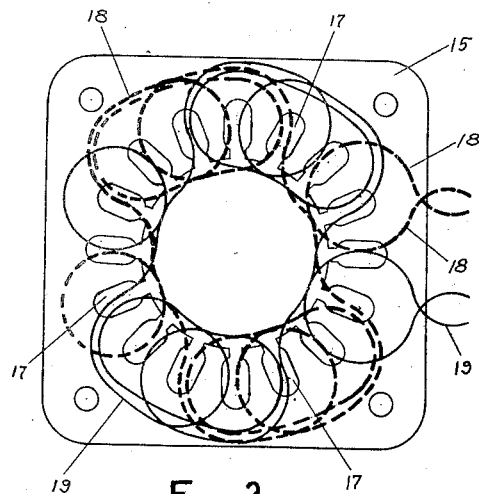
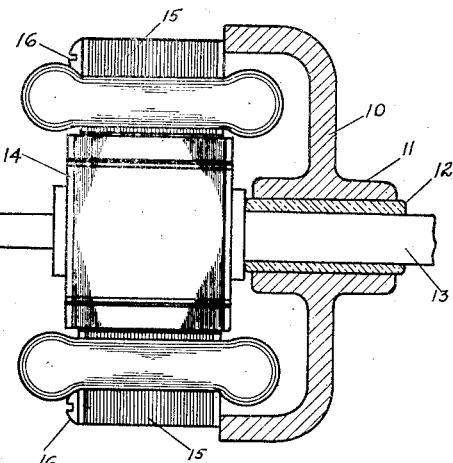
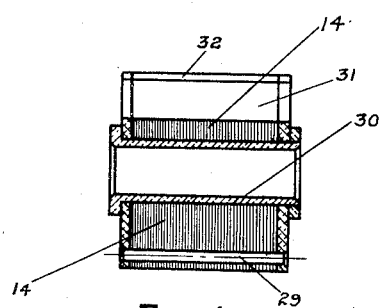
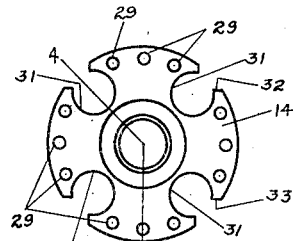
INVENTOR
JOSEPH YOUHOUSE.
BY John A. Hanrahan
ATTORNEY Patented Jan. 17, 1933

1,894,455

UNITED STATES PATENT OFFICE

JOSEPH YOUHOUSE, OF FAIRFIELD, CONNECTICUT, ASSIGNOR TO COLUMBIA PHONOGRAPH COMPANY, INC., OF BRIDGEPORT, CONNECTICUT, A CORPORATION OF NEW YORK

SYNCHRONOUS MOTOR

Application filed May 9, 1930. Serial No. 450,997.

This invention relates to new and useful improvements in electric motors.

An object of the invention is to provide a synchronous motor which is self-starting and which will, in proportion to its size, develop considerable more power than is usual in such motors.

Another object is to provide a synchronous motor including in its field, with the regular field winding, a condenser winding, both of said windings being fed from a single phase power source, and the condenser winding operating with the regular winding while the motor is running.

A further object is to provide an improved rotor for electric motors.

An additional object is to provide a motor having improved field windings and an improved rotor, the parts being so proportioned and assembled as to give the desired results.

Other objects and advantages will become apparent from a consideration of the following detailed description taken in connection with the accompanying drawing showing one embodiment of the invention. However, it will be understood that the invention is not limited to the details disclosed, but resides in the construction, combination and arrangement of parts and is limited only by the scope of the claims to which reference must be had for a definition of the limitations of the invention.

In the drawing:

Figure 1 is a diagrammatic view of the motor circuit;

Fig. 2 is an elevational view of the stator upon which the field windings are carried, the windings being indicated;

Fig. 3 is a side view partly in section and partly in elevation showing the assembled motor;

Fig. 4 is a sectional view of the rotor taken along the line 4—4 of Fig. 5; and

Fig. 5 is an end elevational view of the rotor.

Referring in detail to the drawing at 10 is shown a mounting or supporting member for the motor, the mounting member 10 including a bearing portion 11 equipped with a suitable liner 12 and through which extends a shaft 13 to which the rotor 14 is secured. At 15 is shown the stator of the motor the same being preferably of laminated construction the laminations being secured together as by means of screws 16.

Stator 15 is open through its center and as probably best shown in Fig. 2 has a number of grooves 17 communicating with the open center of and running the length of the stator. Wound back and forth through these grooves is the field winding 18, the position of the windings of this regular field being indicated by heavy broken line. Also, wound back and forth through the grooves 17 is the condenser coil 19, the same being indicated by relatively light solid line.

The turn ratio of the condenser winding relative to the regular winding 18 is such that in operating the motor with a proper sized condenser 20 in the circuit of the condenser winding, the current in the condenser winding, is 90 electrical degrees out of phase with the regular winding 18 of the motor. Fig. 1 shows the wiring diagram, the motor being connected with a single phase source of power and current being carried to the motor through a line 21 to a contact 22 to which one end of the condenser winding 19 is connected, the line or wire from the other terminal of the condenser winding being designated 23 and connected with the condenser. A line 24 completes the circuit from the condenser to the other side 25 of the main circuit.

By a connection 26 and a contact 27 one end of the regular winding 18 is included in the circuit the other end of the winding being connected with the return wire 25 as at 28. From the diagram it will be apparent that both of the windings 18 and 19 are operating windings and that the condenser winding 19 is constantly energized and employed during the time the motor is running.

The rotor 14 is also preferably laminated the laminations being secured together as by means of rods 29 passing lengthwise through the rotor. A bearing sleeve 30 within the rotor is adapted to be disposed over a portion of the shaft 13 to mount the rotor on the shaft. As disclosed the rotor has four pole pieces, the rotor being cut away at four equally spaced points, the cuts being substantially circular as indicated at 31. It has been ascertained that the gap or mouth opening 32 between the pole pieces is a more or less critical point and that the gap must be properly proportioned relative to the remainder of the motor to prevent slipping under load. I have found that by cutting back or inclining the pole pieces at the edges of the gap 32, as at 33, the device is rendered less critical and less prone to slip.

It will, of course, be understood that the invention is not limited to a four pole piece motor. The windings 18 and 19 are such that the north pole magnets in the stator as created by the windings are directly opposite to each other and that the south pole magnets are also directly opposite each other. Further, the magnetic poles created by the condenser coil 19 are disposed approximately at an angle of 90° to the magnetic poles created by the regular winding 18.

The magnetic poles of one winding as for example of the condenser winding will be at zero when the magnetic poles of the regular winding are at their maximum strength. This is on the first half of the wave and on the second half the other set of magnetic poles, that is, those of the condenser winding will be at their maximum when the magnetic poles of the regular winding are at zero. Therefore, the pull is constantly shifting resulting in even movement of the rotor.

The invention provides a single phase motor having two operating windings one of which is so placed, proportioned and used that it gives the motor the operating characteristics of a two phase motor. The second winding, that is, the winding 19 is energized from the condenser and the current in this condenser winding is 90 electrical degrees out of phase with the regular winding 18.

It has been ascertained that in operation the present motor has a higher power factor, higher efficiency, does not create radio disturbance, and weighs less than present single phase motors of proportionately the same power. The rotor 14 is so shaped that an extremely irregular magnetic flux path results between the opposite pole points of the stator. Further, this design and shape of rotor enables the same to quickly attain synchronous speed and to carry a high proportionate load at such speed.

Additionally the motor of the present invention while synchronous is self-starting and the two windings 18 and 19 are in use during the entire time the motor is running. From this it will be seen that I have provided a single phase self-starting synchronous motor. Experiments have shown that the motor has a great deal of additional power due to the condenser winding being an operating winding and it has further been ascertained that the omission of the condenser has such an effect that the motor will not reach synchronous speed.

Having thus described the invention, what is claimed is:

1. In a rotor, a body of magnetic material, said body having openings therethrough in parallel relation with the axis of the body, slots through the outer surface of said body and entering said openings, said body at the longitudinal edges of said slots inclining in opposite directions, said openings and slots dividing said body into a plurality of pole pieces of which one is located between each set of openings and slots, and at least three conductor members carried by and movable with each of said pole pieces.

2. In a rotor, a body of magnetic material, said body having openings therethrough in parallel relation with the axis of the body, slots through the outer surface of said body and entering said openings, the portions of said body at the longitudinal edges of said slots inclining in opposite directions, said openings and slots dividing said body into a plurality of pole pieces of which one is located between each pair of openings and slots, at least three conducting members in each of said pole pieces in parallel relation with the axis of said body, said conducting members in each pole piece equally spaced from the other conducting members in said pole piece, and said slots of such width that the conducting members in each pole piece are closer to one another than they are to the conducting members in the next adjacent pole piece.

3. In a motor, a rotor comprising a body of magnetic material divided by openings and slots into a plurality of pole pieces, at least three conductors carried by each of said pole pieces, a stator having the same number of pole pieces as the rotor, a pair of windings on said stator, and a condenser in the circuit of one of said windings whereby the currents in said windings are off-set in timed relation.

4. In a motor, a rotor comprising a body of magnetic material, said body having openings therethrough in parallel relation with the axis of the body, slots through the outer surface of said body and entering said openings, the portions of the body at the longitudinal edges of said slots inclining outwardly in opposite directions, said openings and slots dividing said body into a plurality of pole pieces of which one is located between each pair of openings and slots, at least three conducting members in each of said pole pieces, said conducting members in each pole piece equally spaced from the other conducting members in said pole piece, said slots of such width that the conducting members in each pole piece are closer to one another than they are to the conducting members in the next adjacent pole piece, a stator within which said rotor is mounted, said stator having the same number of pole pieces as the rotor, a pair of windings on said stator, and a condenser in one of said windings whereby the currents in said windings are slightly off-set in timed relation.

Signed at Bridgeport, in the county of Fairfield and State of Connecticut, this 3rd day of May, A. D. 1930.

JOSEPH YOUHOUSE.